(12) United States Patent
Rotte et al.

(10) Patent No.: US 10,547,795 B2
(45) Date of Patent: Jan. 28, 2020

(54) BRIGHTNESS CORRECTION OF A PIXEL ARRAY IN AN IMAGE SENSOR

(71) Applicant: GVBB HOLDINGS S.A.R.L., Luxembourg (LU)

(72) Inventors: Jeroen Rotte, Breda (NL); Rik Visser, Everdingen (NL)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 37 days.

(21) Appl. No.: 15/693,295

(22) Filed: Aug. 31, 2017

(65) Prior Publication Data
US 2018/0070020 A1  Mar. 8, 2018

Related U.S. Application Data

(60) Provisional application No. 62/385,153, filed on Sep. 8, 2016.

(51) Int. Cl.
| | |
|---|---|
| *H04N 5/243* | (2006.01) |
| *H04N 5/235* | (2006.01) |
| *H04N 5/341* | (2011.01) |
| *H04N 5/357* | (2011.01) |

(52) U.S. Cl.
CPC ........ *H04N 5/243* (2013.01); *H04N 5/2351* (2013.01); *H04N 5/341* (2013.01); *H04N 5/357* (2013.01)

(58) Field of Classification Search
CPC ...... H04N 5/243; H04N 5/3651; H04N 5/357; H04N 5/2351; H04N 5/341
USPC .................. 348/241–243, 246, 247
See application file for complete search history.

(56) References Cited

U.S. PATENT DOCUMENTS

| | | |
|---|---|---|
| 2009/0251580 A1 | 10/2009 | Schemmann et al. |
| 2011/0001841 A1 | 1/2011 | Shiraishi et al. |
| 2015/0256760 A1* | 9/2015 | Ju .................... H04N 5/243 |
| | | 348/256 |

OTHER PUBLICATIONS

International Search Report & Written Opinion issued in PCT/EP2017/072447 dated Nov. 29, 2017.

\* cited by examiner

*Primary Examiner* — Yogesh K Aggarwal
(74) *Attorney, Agent, or Firm* — Arent Fox LLP

(57) ABSTRACT

An image processor is provided for correcting brightness of saturated pixels of a captured image. The image processor can include a pixel saturation determiner that whether one or more pixels in an image sensor have been saturated by comparing pixel brightness levels of the pixels to a predetermined saturation threshold. Moreover, the image processor includes an image enhancer that generates a corrected image without artifacts due to the saturated pixel(s) by replacing the pixel brightness of the saturated pixel(s) with a pixel correction value that is based on a pixel brightness of one or more unsaturated pixel in the image sensor.

19 Claims, 14 Drawing Sheets

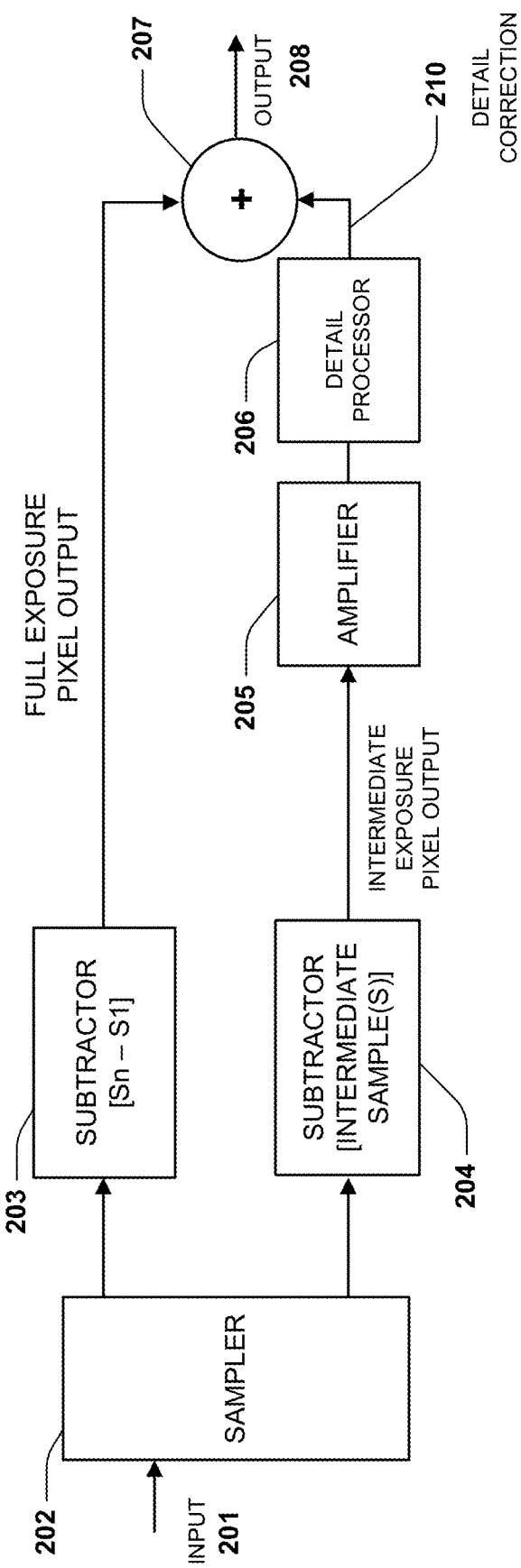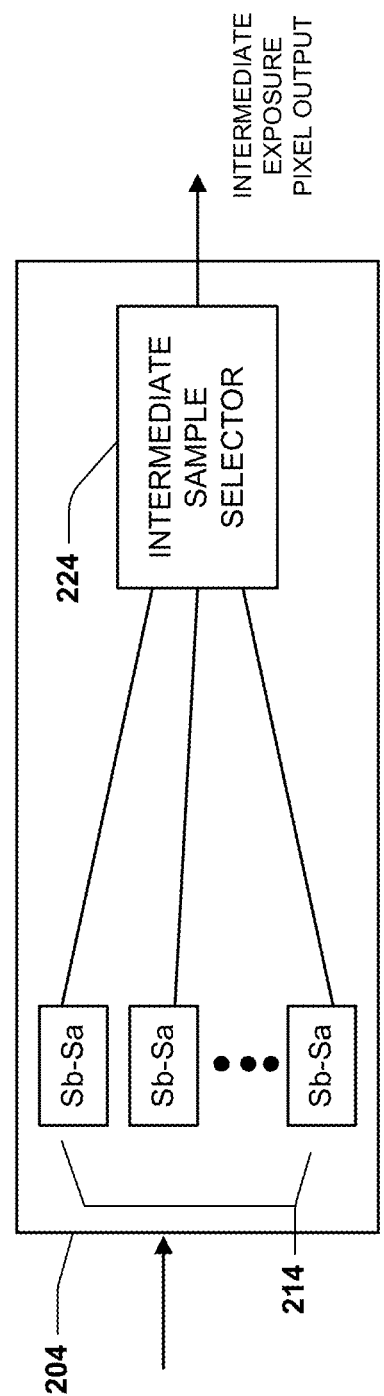
FIG. 2A
FIG. 2B

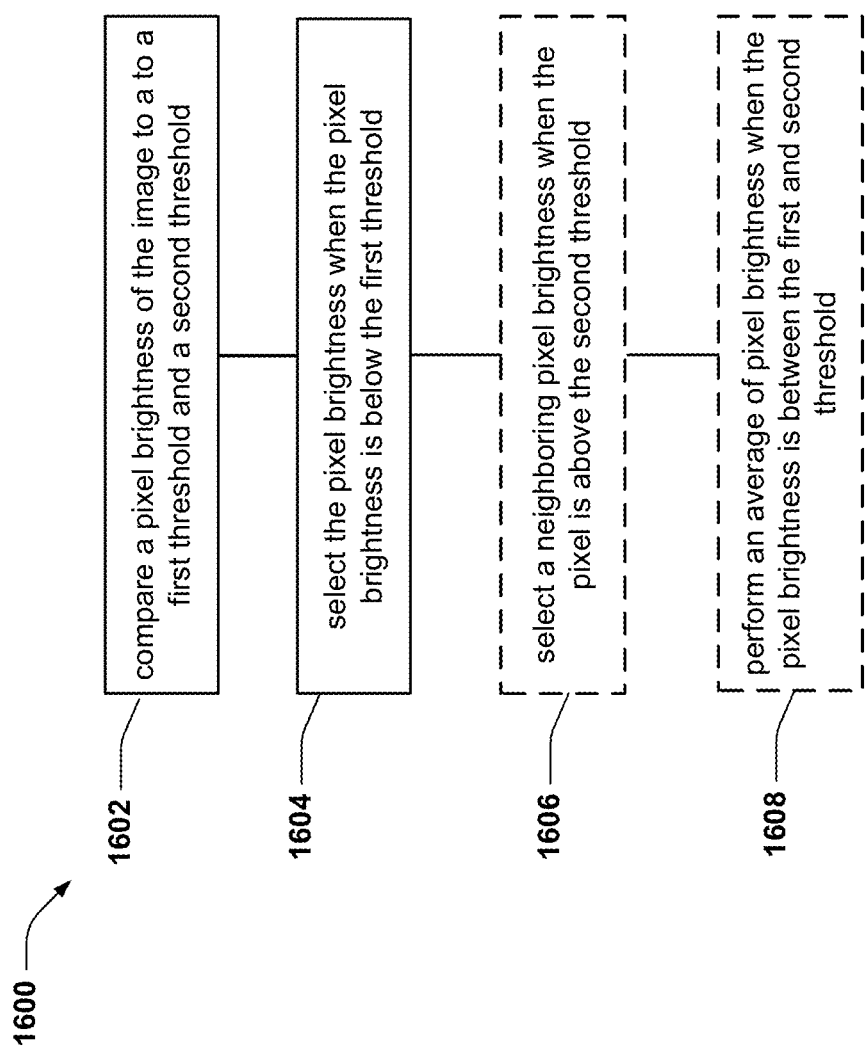

BRIGHTNESS CORRECTION OF A PIXEL ARRAY IN AN IMAGE SENSOR

CROSS REFERENCE TO RELATED APPLICATIONS

The current application claims priority to U.S. Patent Provisional Application No. 62/385,153, filed Sep. 8, 2016, the entire contents of which are hereby incorporated by reference.

TECHNICAL FIELD

The present disclosure relates generally to image data and more particularly, to bright correction in image data.

BACKGROUND

When using, for example, a camera, to take pictures, bright areas of a scene may saturate one or more pixels on a sensor in the bright area of the picture. The pixels may not all saturate at the same brightness level. In a bright area, one pixel may saturate before other pixels around the saturated pixel. One pixel saturating before other pixels around the saturated pixel may sometimes occur with shared pixels. A shared pixel is a structure in which a part of a set of pixel transistors is shared by a plurality of pixels. With the shared pixel structure, a selection transistor, a reset transistor, and an amplification transistor may be shared, for example. The selection transistor, the reset transistor, and the amplification transistor may be shared in a plurality of pixels.

By using a shared pixel structure, an area of the pixel transistors, e.g., the selection transistor, the reset transistor, and the amplification transistor, may be arranged such that an area of each pixel may be decreased. For a shared pixel, there may be differences in saturation level between the pixels of the shared pixel structure. One example of a shared pixel structure that may include pixels having different saturation levels is the quincunx pixel structure. Another example shared pixel structure that may include pixels having different saturation levels is a quadruplet pixel structure.

Other structures may include pixels having different saturation levels. Furthermore, other non-shared pixel structures may also include pixels having different saturation levels. For example, a quadruplet pixel structure that is not also a shared pixel structure may include pixels having different saturation levels.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect may include a camera sensor system. The camera sensor system may include an image sensor. Additionally, the camera sensor system may include a processor coupled to the camera sensor. The processor may be configured to process an image from the image sensor by comparing a pixel brightness of the image to a first threshold and a second threshold. The processor may also be configured to select the pixel brightness when the pixel brightness is below the first threshold. Additionally, the processor may be configured to select a neighboring pixel brightness when the pixel is above the second threshold. The processor may also be configured to perform an average of pixel brightness when the pixel brightness is between the first and second threshold.

According to another exemplary aspect, an image processing system is provided for correcting brightness of saturated pixels in an image sensor. In this aspect, the image processing system includes a pixel array comprising a plurality of pixels each configured to capture image data; a pixel brightness measurement engine configured to measure a pixel brightness of the at least one pixel of the plurality of pixels for the captured image data; a pixel saturation determiner configured to determine that the at least one pixel is saturated when the measured pixel brightness is greater than a predetermined pixel saturation threshold; a pixel brightness interpolator configured to calculate an interpolated brightness value to correct the saturated at least one pixel based on the measured brightness value of the saturated at least one pixel and a brightness value of at least one neighboring pixel of the plurality of pixels that is adjacent to the saturated at least one pixel; a pixel brightness corrector configured to correct the pixel brightness of the saturated at least one pixel based on the calculated interpolated brightness value; and an image generator configured to display on a display device the captured image data having the corrected pixel brightness of the saturated at least one pixel.

In another aspect, an image processing system is provided for correcting brightness of saturated pixels in an image sensor. In this aspect, the image processing system includes a pixel brightness measurement engine configured to measure a pixel brightness of a plurality of pixels for image data captured by a camera; a pixel saturation comparator configured to compare a measured pixel brightness of at least one of the plurality of pixels with first and second saturation thresholds; a pixel brightness selector configured to select the measured pixel brightness of the at least one pixel as an output pixel brightness when the measured pixel brightness of the at least pixel is less than the first saturation threshold, and to select a measured pixel brightness of at least one neighboring pixel as the output pixel brightness when the measured pixel brightness of the at least pixel is greater than the second saturation threshold; and an image generator configured to display on a display device the image data having the selected output pixel brightness of the at least one pixel of at least one of the plurality of pixels.

In yet another aspect, an image processor for correcting brightness of saturated pixels of a captured image. In this aspect, the image processor includes a pixel saturation determiner configured to determine whether at least one pixel in an image sensor is saturated when a pixel brightness of the at least one pixel is greater than at least one saturation threshold; and an image enhancer configured to generate a corrected image without one or more image artifacts due to the saturated at least one pixel by replacing the pixel brightness of the saturated at least one pixel with a pixel correction value based on a pixel brightness of at least one unsaturated pixel in the image sensor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is block diagram of an example detail correction circuit of a pixel processor enhanced by using an intermediate exposure for the detail correction signal according to an exemplary embodiment.

FIG. 2B is a block diagram of an example subtractor for determining multiple intermediate exposures according to an exemplary embodiment.

FIG. 16 is a flowchart illustrating an example method for pixel brightness correction according to an exemplary embodiment.

DETAILED DESCRIPTION

Figure 1:
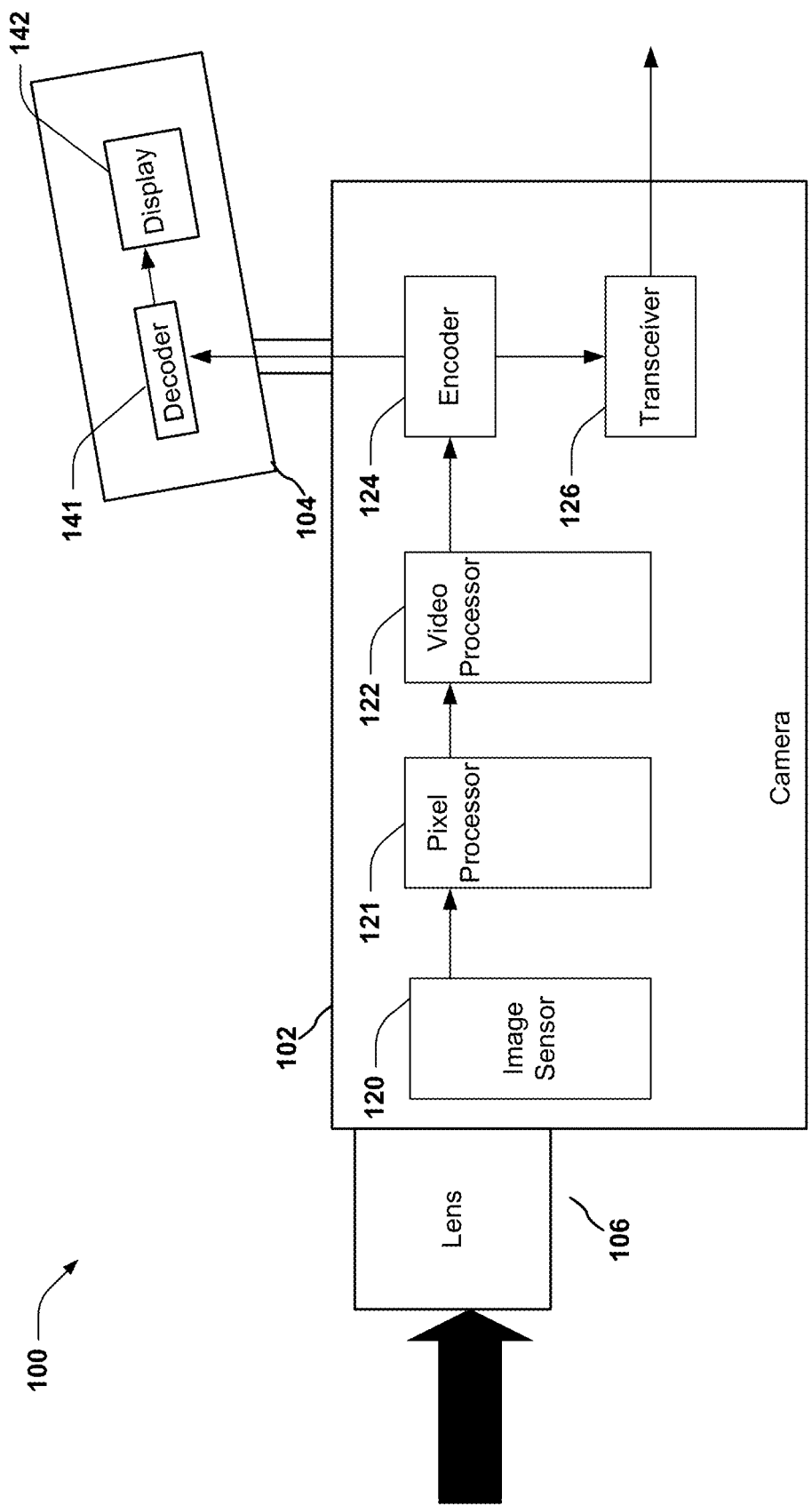
FIG. 1 is a block diagram of an example camera system 100 having a viewfinder display according to an exemplary embodiment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Certain aspects of video production systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "pixel processor" that includes one or more processors. Examples of processors include microprocessors, microcontrollers, image processors, digital signal processors (DSPs), field programmable gate arrays (FPGAs), application specific integrated circuits (ASICs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, non-transitory storage such as a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, as well as a carrier wave, a transmission line, and any other suitable medium for storing or transmitting software. The computer-readable medium may be resident in the processing system, external to the processing system, or distributed across multiple entities including the processing system. Those skilled in the art will recognize how best to implement the described functionality presented throughout this disclosure depending on the particular application and the overall design constraints imposed on the overall system.

FIG. 1 is a simplified block diagram illustrating an example camera system 100 that implements a pixel processor 122. Camera system 100 may comprise a camera 102, the viewfinder 104, and a lens system 106. Camera 102 may include an image sensor 120, which may comprise an array of pixels to convert photons to electrical charges. Among others, the image sensor may comprise a charged coupled device (CCD) or complementary metal oxide semiconductor (CMOS). Thus, the array of pixels may comprise an array of CCD or CMOS pixels. An image is projected by the lens system 106 onto the image sensor 120. The output of the image sensor 120 comprises an output signal from the array of pixels. The image sensor 120 produces a voltage signal by converting the photon input level for each pixel to a proportional voltage signal for each pixel in the array. The pixels of the image sensor 120 are exposed to photons, e.g., projected by the lens system 106, and read by the pixels of the image sensor in time units of frame exposures. Each pixel accumulates an electrical charge representative of the image during the course of the exposure frame. The image sensor 120 may convert the electrical charge to an analog output voltage signal. Alternatively, the image sensor 120 may convert the electrical charge to an analog voltage and convert the analog voltage to a digital signal using an analog to digital converter, for example, to produce a digital output voltage signal. The image sensor 120 may transmit the output voltage signal periodically at the frame rate. The pixel may be reset by discharging the accumulated charge so that the next pixel charge accumulation for the next frame can begin. The amount of light photons may be converted to the voltage signal up to a saturation threshold, at which point no further charge can be accumulated for the pixel output. In one example, multiple image sensors 120 may operate in a synchronous manner. Multiple image sensors 120 may also operate in different phases relative to one another.

Pixel processor 121 may be configured to correct the image sensor pixel output signals for motion blur. The output of the pixel processor 121 may be an array of pixel signals to form an image for each frame exposure of the video sequence. Camera 102 includes a video processor 122 that receives a sequence of images and produces a digital video output having a desired frame rate, aspect ratio, etc. The video processor 122 may also perform white balance, color correction, and gamma correction to the video images. The video processor 122 may be implemented as a plurality of separate processors each configured to perform one or more of the above functions. Alternatively, the pixel processor 121 and video processor 122 may be arranged in a reverse manner, whereby the pixel processor 121 processes images on a per pixel basis already corrected by the video processor 122.

An encoder 124 may receive a raw video output from video processor 122 and produce a formatted digital video signal encoded according to a particular specification (e.g., Serial Digital Interface (SDI), H.264/MPEG-4 Advanced Video Coding, or High Definition Multimedia Interface (HDMI)). The signal from encoder 124 may be output for transmission to a video production system and/or over a network using transceiver 126. Encoder 124 may also provide an encoded or raw video feed to viewfinder 104.

Viewfinder 104 may include a decoder 141 configured to receive encoded video or raw video from encoder 124 and provide image data for the display 142. In one example, the display 142 may include an organic light-emitting diode (OLED) at each pixel, whereby a light-emitting diode (LED) is coated with an emissive electroluminescent layer formed from an organic compound which emits light in response to an electric current. These and other devices may be used to generate images on the display 142.

Lens system 106 may include one or more lenses and may be controlled to provide a desired optical configuration of lenses, which configuration may specify, for example, a depth of field setting, a numerical aperture, and a focal length.

FIG. 2A is block diagram of an example detail correction circuit 200 of the pixel processor 121 for sampling the image sensor 120 during an intermediate portion of the frame to produce a signal representative of the image. For each pixel of the image sensor 120, the sampler 202 receives input 201, which is the pixel output received from the image sensor 120. The sampler 202 may read the cumulative pixel output values (e.g., an electrical charge or output voltage signal values) at discrete time samples S1 to Sn. Samples S1 and Sn may occur at the beginning and end of an exposure frame, respectively, with one or more samples occurring between samples S1 and Sn. For example, with n=4, sample Sn=S4 occurs at the end of the frame exposure, a sample S2 may occur at about 25% of the full frame exposure interval, and a sample S3 may occur at about 75% of the full frame exposure interval. Alternatively, sample S2 may occur at about 33% of the full frame exposure interval, and a sample S3 may occur at about 66% of the full frame exposure interval. As an alternative example, with n=3, sample S3 occurs at the end of the exposure frame, and a sample S2 may occur anywhere between about 25 to 75% of the frame exposure. Other possible alternative variations for n>4 may be implemented, where sampler 202 provides additional samples of pixel output values within the full frame exposure. For a CMOS implementation of image sensor 120, the sampler 202 may operate as described above to read the multiple samples per exposure frame. In the case of a CCD implementation of image sensor 120, reading intermediate samples may not be possible within a single frame. Consequently, a CCD image sensor 120 may need to operate at a faster frame rate than the nominal rate for the camera 100 to simulate multiple samples within the nominal frame. For example, if the video signal for camera 100 is processed at rate of 50 FPS (20 ms frames), and sampler 202 requires four samples per frame (n=4), then the CCD image sensor 120 may operate at a faster rate of 200 FPS (5 ms frames), yielding 4 CCD images per 20 ms frame. Each set of samples S1 to S4 may then be derived from a block of four CCD images for an equivalent 20 ms frame.

A subtractor 203 determines the cumulative pixel output (e.g., electrical charge or output voltage signal value) for the full frame exposure by subtracting the pixel output value at sample S1 from the cumulative pixel output value at sample Sn. A subtractor 204 determines the cumulative pixel output value of an intermediate frame exposure by subtracting the cumulative pixel output value at sample S2 from cumulative pixel output value at sample S3. For the example of n=4, sample S2 at 25% of the exposure frame and sample S3 at 75% of the full frame exposure interval, the intermediate exposure provides the pixel output value for the middle 50% of the frame exposure. For the example where n=4, sample S2 occurring at about 33% of the frame exposure and sample S3 at about 66% of the full frame exposure, the intermediate exposure provides the pixel output for the middle third of the full frame exposure. Alternatively, for the example of n=3, sample S3 occurs at the end of the full frame exposure, and sample S2 at 50% of the full frame exposure, subtractor 204 may subtract the pixel output value at sample S2 from the pixel output value at sample S3 to provide an intermediate exposure value related to the last half of the full frame exposure. Alternatively, subtractor 204 may subtract the pixel output value at sample S1 from the pixel output value at sample S2 to provide an intermediate exposure value related to the first half of the full frame exposure.

FIG. 2B shows a block diagram for an example subtractor 204, in which multiple intermediate exposures may be determined. In an embodiment with sampler 202 reading samples Sn for n>4, multiple intermediate exposures may be obtained by subtractor 204 by using multiple subtractors 214 to each determine the respective intermediate exposure separately. For example, for n=6, intermediate exposures S6-S5, S5-S4, S4-S3, S3-S2 and S2-S1 may be determined by one or more subtractors 214. Selector 224 may be implemented as a multiplexer to adaptively select which intermediate exposure is to be processed by the detail correction circuit 200.

Amplifier 205 receives the pixel output of the intermediate frame exposure and amplifies it as a normalization to a full frame exposure. For example, the amplifier 205 may apply a 6 dB boost to the cumulative pixel output value. A detail processor 206 receives the amplified pixel output value and performs a detail correction algorithm to correct motion blur. The detail processor 206 improves the perceived image sharpness by generating a correction signal at any signal transition. Transitions in luminance and/or chrominance are emphasized by the detail processor 206 to enhance objects in a scene. The calculated detail correction is added to the original image on a pixel-by-pixel basis. This detail correction signal depends on the sharpness of the image. In this example, the intermediate exposure contains 50% of the motion blur for the pixel. By performing detail correction on the shorter intermediate frame exposure instead of the full frame exposure, the effect of motion blur in the pixel is reduced, which enhances the effectiveness of the detail correction. Summer 207 is configured to add the detail correction signal to the full exposure pixel output, giving an enhanced pixel output 208.

Figure 3:
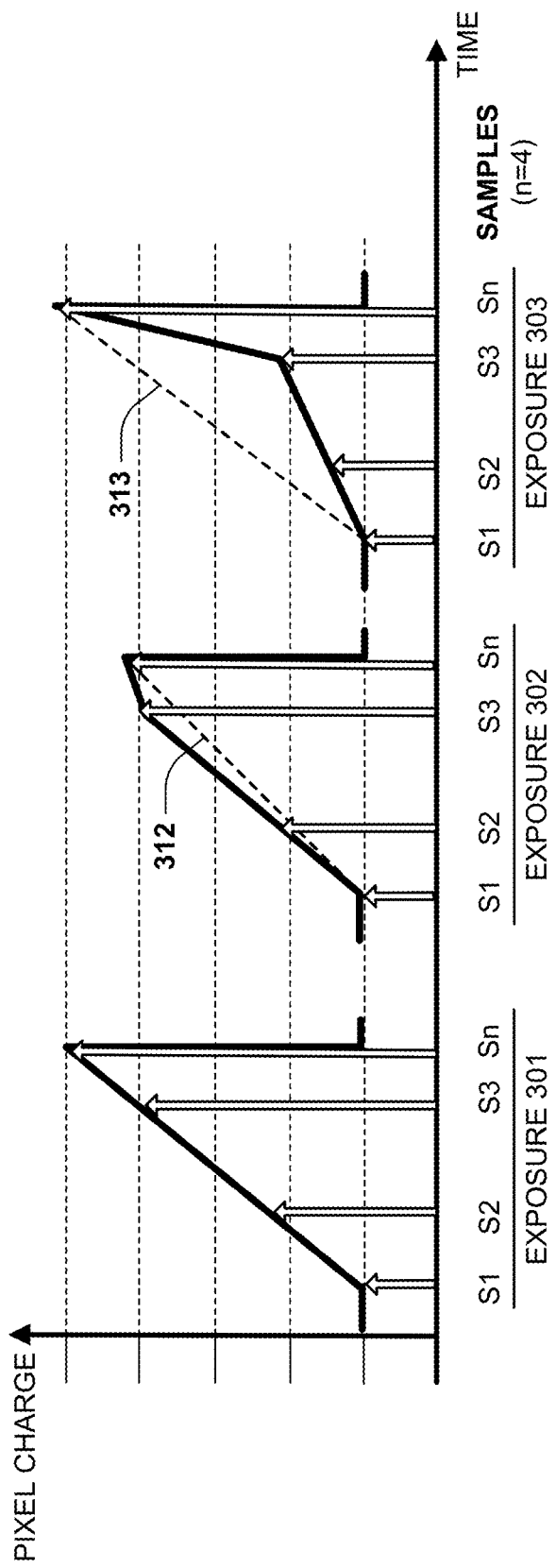
FIG. 3 a graphical illustration of example pixel charge rates during a sequence of exposures as an indication of motion presence.

FIG. 3 is a graphical illustration of an example sampling of an image sensor 120 pixel output for multiple samples S1 to Sn during a series of single frame exposures 301, 302, 303. In this example, n=4 and cumulative pixel output values are sequentially read at samples S1, S2, S3 and S4, with samples S1 and S4 providing the cumulative pixel output for a full frame exposure as sample S1 occurs at the beginning of the frame, and sample S4 occurs at the end of the frame. A pixel output of image sensor 120 for an intermediate frame exposure can be obtained between samples S2 and S3. For exposure 301, the constant slope of the accumulating pixel output during the interval between S1 and S4 indicates a constant photon input for this pixel, which means a constant light level is being reflected from an object in the camera field of view. Since the light level is constant, the object is likely fixed and not moving across this pixel unit within the frame exposure 301. In contrast, the frame exposures 302 and 303 illustrate pixel charge rate variation between each sample pair interval (e.g., Si and Si+1). For example, in exposure 302, the rate of pixel charge accumulation is constant between samples S1 and S2, S2 and S3, but falls between samples S3 and Sn, revealing the presence of motion for the pixel output, from a brighter object to a darker object, and hence the potential for motion blur. Exposure 303 shows the presence of motion as a transition from a darker object to a brighter object being sensed by the pixel of image sensor 120 (i.e., more light photons being sensed by the pixel), as the pixel charge rate increases between samples S3 and Sn compared to the pixel charge rate between S1 and S3. Thus, with the sampler 202 configured to track intermediate exposures within each frame, (e.g., between samples S2 and S3), motion is detectable. In contrast, a conventional approach which measures pixel output only at the beginning of the frame and at the end of the frame (i.e., at samples S1 and Sn) would give misleading pixel charge rates 312 and 313, and overlook the indication of motion.

Figure 4:
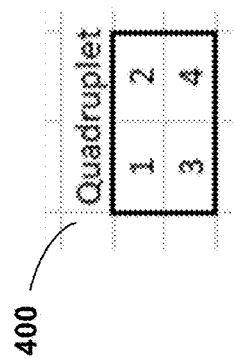
FIG. 4 is a diagram illustrating a quadruplet pixel structure.

FIG. 4 is a diagram illustrating a quadruplet pixel structure 400. The quadruplet pixel structure may have four sub-pixels, e.g., 1, 2, 3, 4. The quadruplet pixel structure may be made up of four individual sub-pixels. In another example, the four sub-pixels, 1, 2, 3, 4, may be four sub-pixels of a shared pixel structure.

Each sub-pixel in the example of FIG. 4, may have a different gain. Accordingly, each of the sub-pixels may saturate at a different level. For example, for a given brightness, e.g., near saturation, some of the four sub-pixels may saturate, while some of the four sub-pixels may not saturate. For example, pixels with higher gains may have more of a tendency to saturate because the higher gain may drive the pixels values higher for a given brightness.

Figure 5:
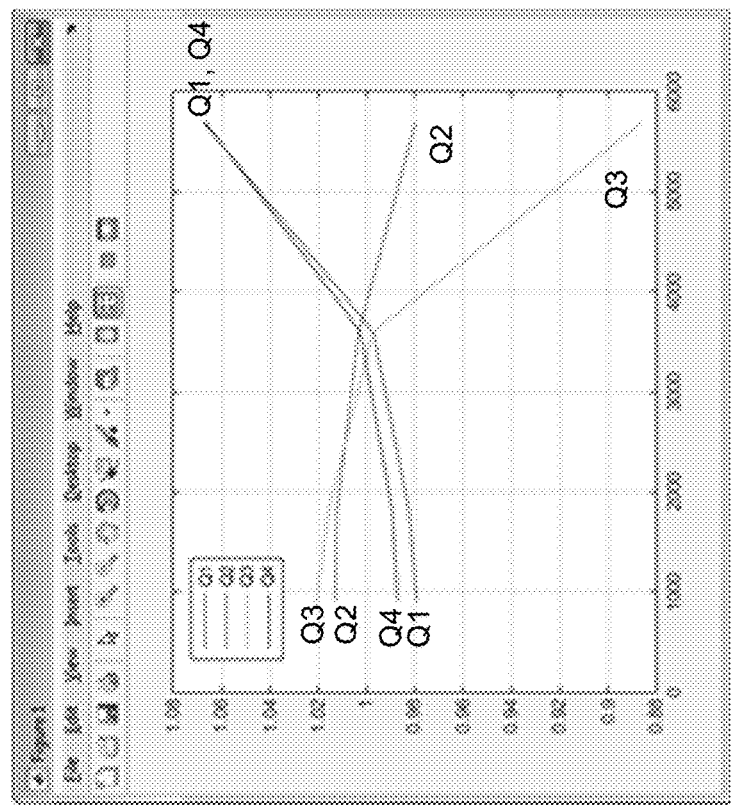
FIG. 5 is a diagram illustrating example gains for the four example pixels of the quadruplet structure of FIG. 4.

FIG. 5 is a diagram illustrating example gains for the four example pixels of the quadruplet structure 400 of FIG. 4. In general, a pixel's gain is how the amount of signal given by the pixel varies as a function of the amount of input light (or equivalent), i.e., accumulated charge during image capture by the image sensor having the pixel array. The gains of the sub-pixels 1, 2, 3, 4, may correspond to the gains Q1, Q2, Q3, Q4 illustrated in FIG. 5. As illustrated in FIG. 5, the gains for Q1 and Q4, for example, may be higher than the gains for Q2 and Q3. Accordingly, the sub-pixels 1 and 4 may saturate more easily than the sub-pixels 2 and 3.

In one example, the separate gains for Q1, Q2, Q3, Q4 may be corrected using an average. For example, pixel 1, gain Q1, may be corrected as: Q1/((Q1+Q2+Q3+Q4)/4). In other examples, a high gain may be disregarded. For example, if the gain for pixel 1, Q1 is greater than the gain for the other pixels, it may be disregarded and pixel 1 may be corrected as the average of the other pixels, e.g., Q2+Q3+Q4/3. In some examples, each quarter of a set of pixels may be averaged over a large area, for example, greater than 50% of an image area may be averaged.

In an example, gain may be calculated using digital double sampling (DDS) values, which are measured electrical values with removed undesired offsets. Because black is at 0 least significant bit (LSB), only a gain is needed, without an offset value. In an example, the range to be corrected is ~2-5%. A large area photo response non-uniformity (PRNU) specification is 0.06%. In an example, 2000*LSB14*0.06%=1,2 LSB14. The gain control range therefore should be ufix(0,16,15).

In some examples, a camera may include a white calibration, which should be available in service menu. White calibration should run during production on a predefined white scene. The result of the white calibration should be stored in memory on a sensor board. The stored results of the white calibration may be loaded during startup in camera, e.g., in less than 10 ms in some examples. Additionally, the camera should be able to switch the use of the white calibration data off in case of emergencies such as data load errors, such as data load errors of the results of the white calibration. In FIG. 5 gain is along the y-axis. Luminance values are along the x-axis. As illustrated in FIG. 5, the gain may not be flat for the whole range of luminance values.

Figure 6:
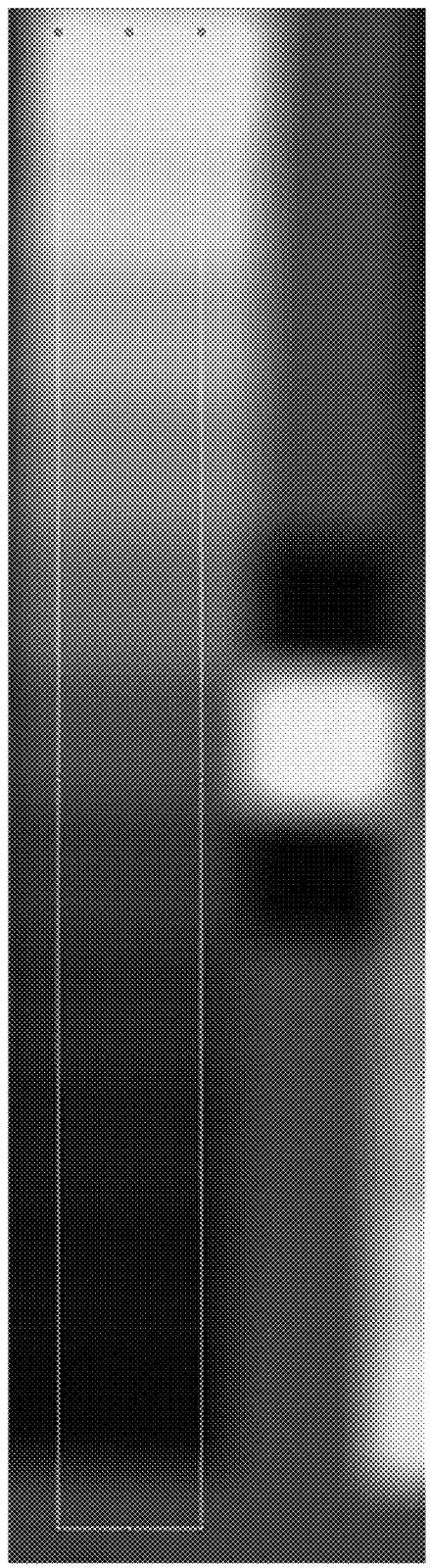
FIG. 6 is a diagram illustrating an example of a pattern that may form due to differences in gain for various pixels in an image sensor.

FIG. 6 is a diagram illustrating an example of a pattern that may form due to differences in gain for various pixels in an image sensor. As discussed, the gain is not flat for the whole range. 100% level (Green) is at 1500 LSB14 (F4 sensitivity). The range from 0-3000 may include LSB14 that is relatively flat. For high illuminations (e.g., >300%, a pattern becomes visible.

Figure 7:
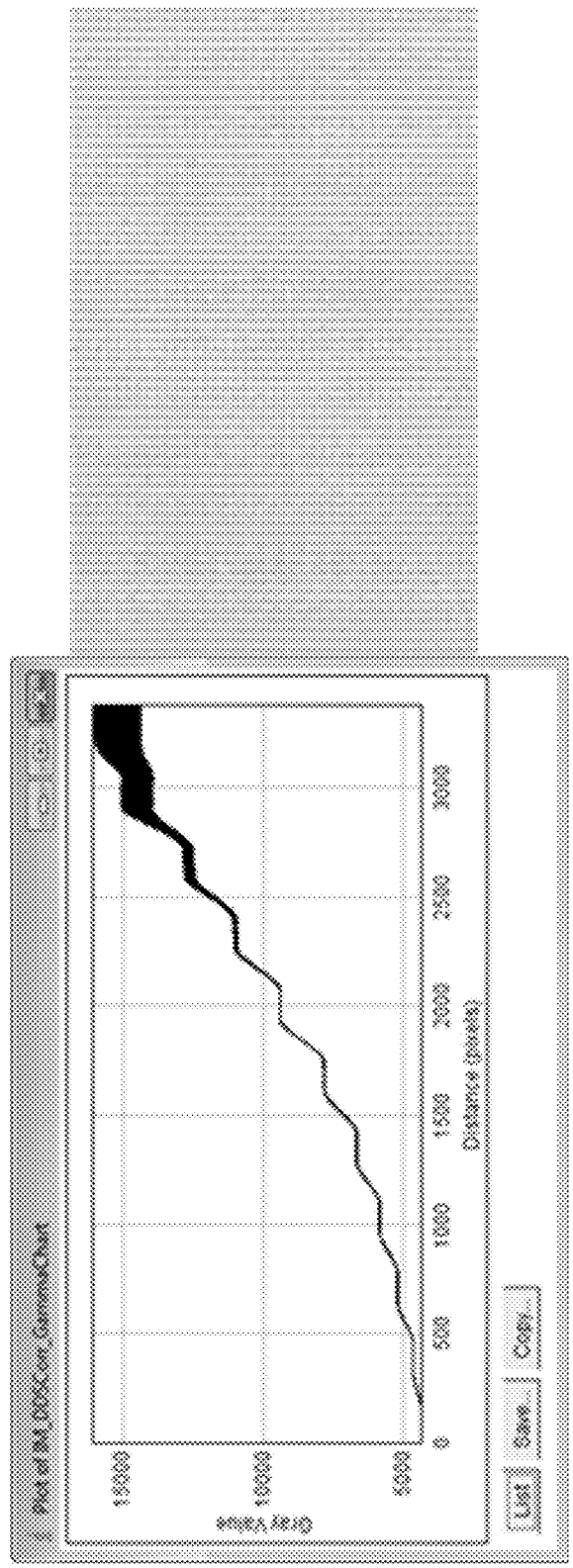
FIG. 7 is a gamma chart illustrating gray value along the y-axis and distance along the x-axis.

FIG. 7 is a gamma chart illustrating gray value along the y-axis and distance along the x-axis. For distance values, in pixels, below approximately 2500, the gray values are fairly linear. At high distance values, however, variations increases. A pattern exists on high levels. As illustrated in FIG. 7, before correction, there is a different saturation level per quadruplet. Note that a pattern forms, as illustrated in FIG. 7.

Figure 8:
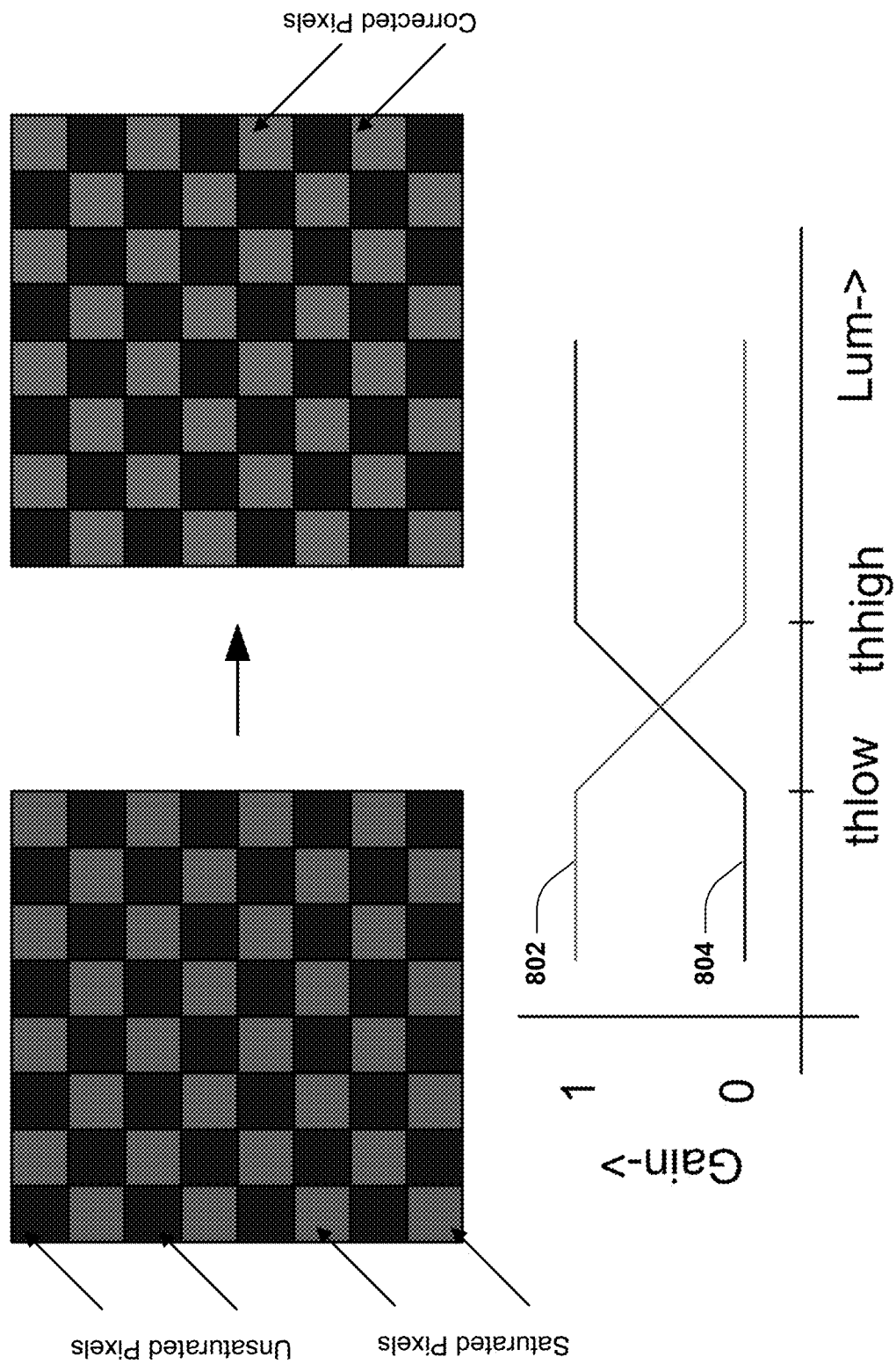
FIG. 8 is a diagram illustrating an example set of pixels and a graph illustrating gains that may be used to fade to a quincunx interpolation for the bright areas to avoid artifacts according to an exemplary embodiment.

FIG. 8 is a diagram illustrating an example set of pixels and a graph illustrating gains that may be used to fade to a quincunx interpolation for the bright areas to avoid artefacts. The graph includes a normalized gain on the y-axis and a luminance value on the x-axis. In an example, brightness values for pixels near saturation may be used to interpolate values for pixels that are saturated. One example may fade to a quincunx interpolation for the bright areas to avoid artefacts.

For example, when a brightness value for a pixel is below a threshold (thlow), the brightness value for that pixel may be used. When the brightness value for a pixel is above a threshold (thhigh) the brightness value for a neighboring pixel or a group of neighboring pixels may be used. Between the thresholds (thlow) and (thhigh) a fade between pixels may be used, as illustrated in FIG. 8. The pixel saturation thresholds (e.g., saturation thresholds (thlow) and (thhigh)) can be predetermined and stored in memory of camera 102 and accessed by the pixel processor 121 during image processing according to an exemplary aspect.

Accordingly, as illustrated in the graph of FIG. 8, below the threshold (thlow), the gain used 802 may be "1." Thus, when a brightness value for a pixel is below a threshold (thlow), the brightness value for that pixel may be used because the gain for that pixel is "1." When the brightness value for a pixel is above a threshold (thhigh) the brightness value 804 for a neighboring pixel or a group of neighboring pixels may be used because the gain for the neighboring pixel or group of pixels is "1," while the gain for that pixel is "0." Between the thresholds (thlow) and (thhigh) a fade between pixels may be used, as illustrated in FIG. 8, because the gain for that pixel is transitioning from "1" to "0," while the gain for the neighboring pixel or group of pixels is transitioning from "0" to "1."

When pixels are saturated, the brightness values for the pixels may be determined based on neighboring pixels. Accordingly, as illustrated in FIG. 8, values for a series of saturated pixels may be interpolated or averaged to neighboring brightness values. The colors in the chart indicate different pixels of interest, rather than actual colors. The lighter pixels on the left image may be pixels for which brightness values are being determined based on the systems and methods described herein. The darker pixels on the left image may be pixels used to determine brightness values for the lighter pixels in conjunction with the starting brightness values for the lighter pixels themselves. As discussed above, below a threshold (thlow), the values for the lighter pixels may be used since the pixels are not saturated. Above a threshold (thhigh), the lighter pixels are determined to be saturated so corresponding brightness values of the unsaturated darker pixels may be used. Between the thresholds, a fade may be used as further described herein.

For an example where the lighter pixels are all above a thresholds (thhigh), in some cases, the lighter color indicates pixels having a saturated brightness. In the chart the darker pixels may be interpolated towards the brightness values for the darker as indicated by the "corrected pixels" after processing. Again, the colors designate certain sets pixels rather than colors for those pixels.

Figure 9:
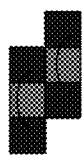
FIG. 9 is an illustration of two pixels interpolated each based on a set of two neighboring pixels according to an exemplary embodiment.

FIG. 9 is an illustration of two pixels interpolated each based on a set of two neighboring pixels. In FIG. 9 each interpolated pixel is interpolated towards a brightness value for the two neighboring pixels. In other words, the two outer pixels are neighboring, unsaturated pixels and the middle pixels have been saturated, i.e., the interpolated pixels may be saturated. Accordingly, values for the neighboring pixels may be used. As illustrated in FIG. 9, the middle pixels are interpolated. The threshold, Thlow is the starting point where original pixel is used. The threshold Thhigh is the minimum, beyond which the pixel is fully interpolated. The systems and methods described herein may be implemented with a threshold and a slope setting as indicated by the following:

```
%Quadruplet fader
threshold = 4000; %LSB14
slope = 10; % Gain on fader
for i = 1 : 2^14
    Vin(i) = i;
    quincunxfadergain(i) = max( min( ((i-threshold)*slope) + 2^13
, 2^14),0);
end
plot(Vin, quincunxfadergain ); hold on;
plot(Vin, 2^14-quincunxfadergain ); hold off;
grid on;
```

Figure 10:
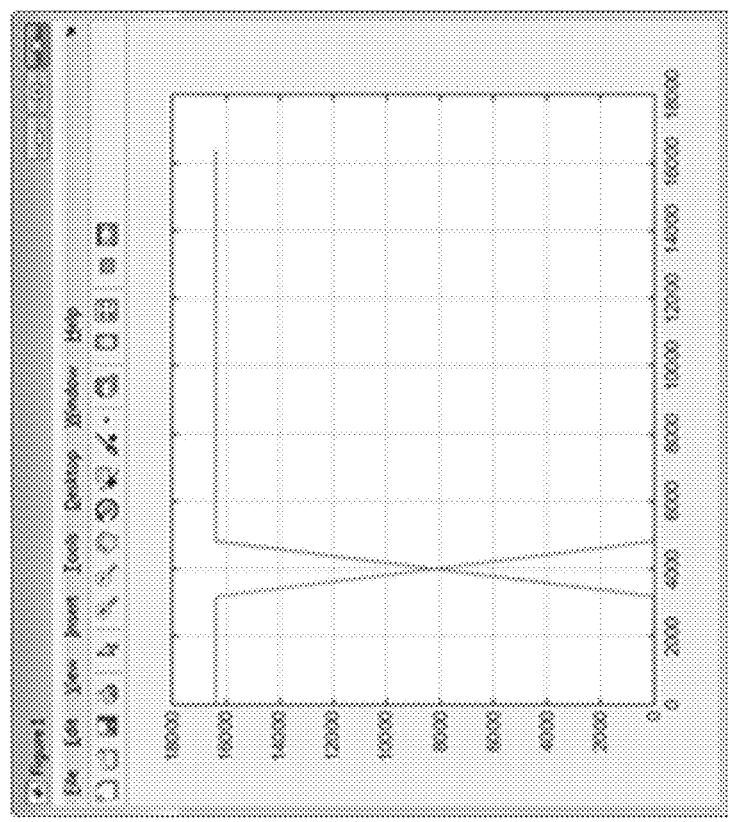
FIG. 10 is an example graph illustrating gain along the y-axis and luminance along the x-axis according to an exemplary embodiment.

FIG. 10 is an example graph illustrating gain along the y-axis and luminance along the x-axis. Unlike the graph illustrated in FIG. 8, the graph illustrated in FIG. 10 is not normalized. Accordingly, the graph illustrated in FIG. 10 includes possible gain and luminance values in an example system. Similar to the discussion with respect to FIG. 8, as illustrated in FIG. 10, when the pixels above the threshold, they are replaced with an interpolated value. Pixels below a threshold are used, while pixels between the thresholds are combined or faded together. Note that the pattern is much more consistent.

Figure 11:
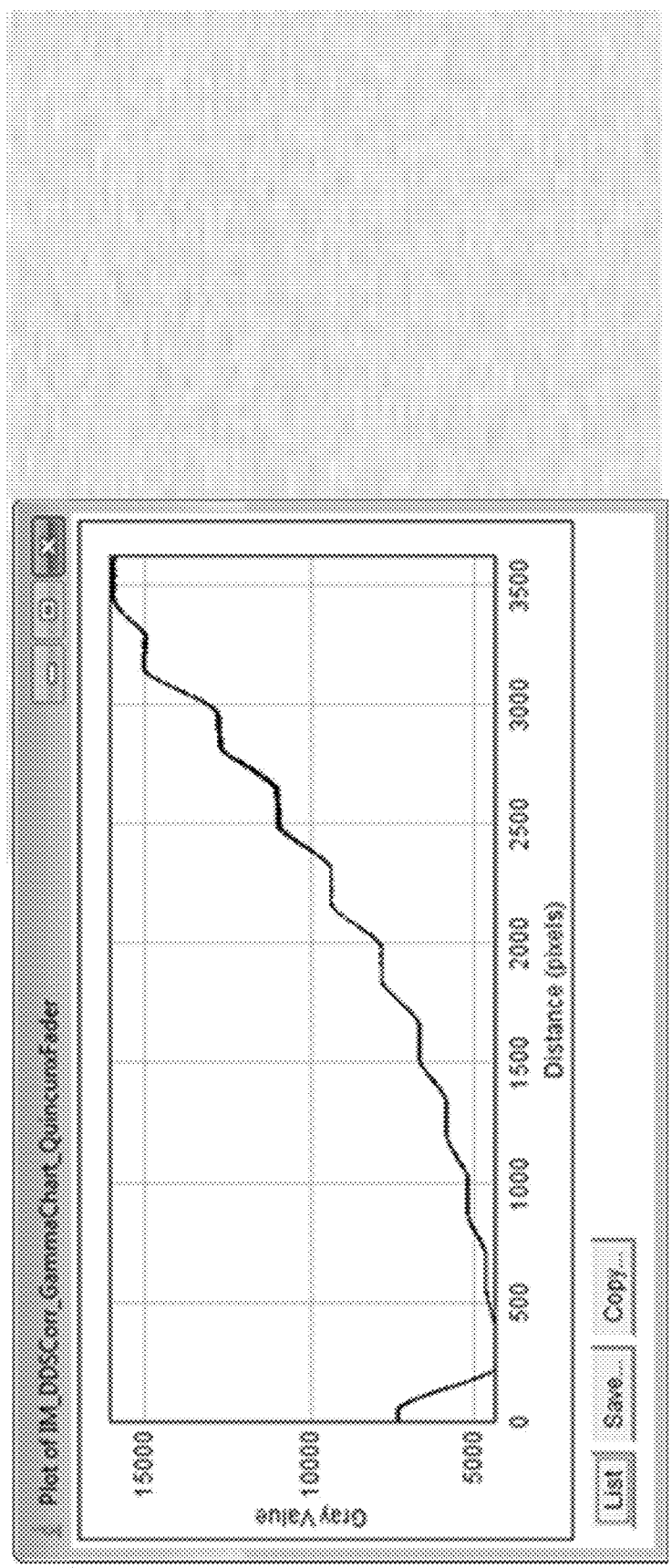
FIG. 11 is a gamma chart illustrating gray value along the y-axis and distance along the x-axis according to an exemplary embodiment.

FIG. 11 is a gamma chart illustrating gray value along the y-axis and distance along the x-axis. For distance values, in pixels, below approximately 2500, the gray values are fairly linear. Using the bright correction described herein, above 2500, the gray values remain fairly linear. A pattern exists on high levels. As illustrated in FIG. 7, before correction, there is a different saturation level per quadruplet.

In some examples, camera requirements may include putting values in a control map with default settings. With a Delphi tool values may be changed when needed, but, in some examples, the values are non-adjustable when an example system is being used.

Figure 12:
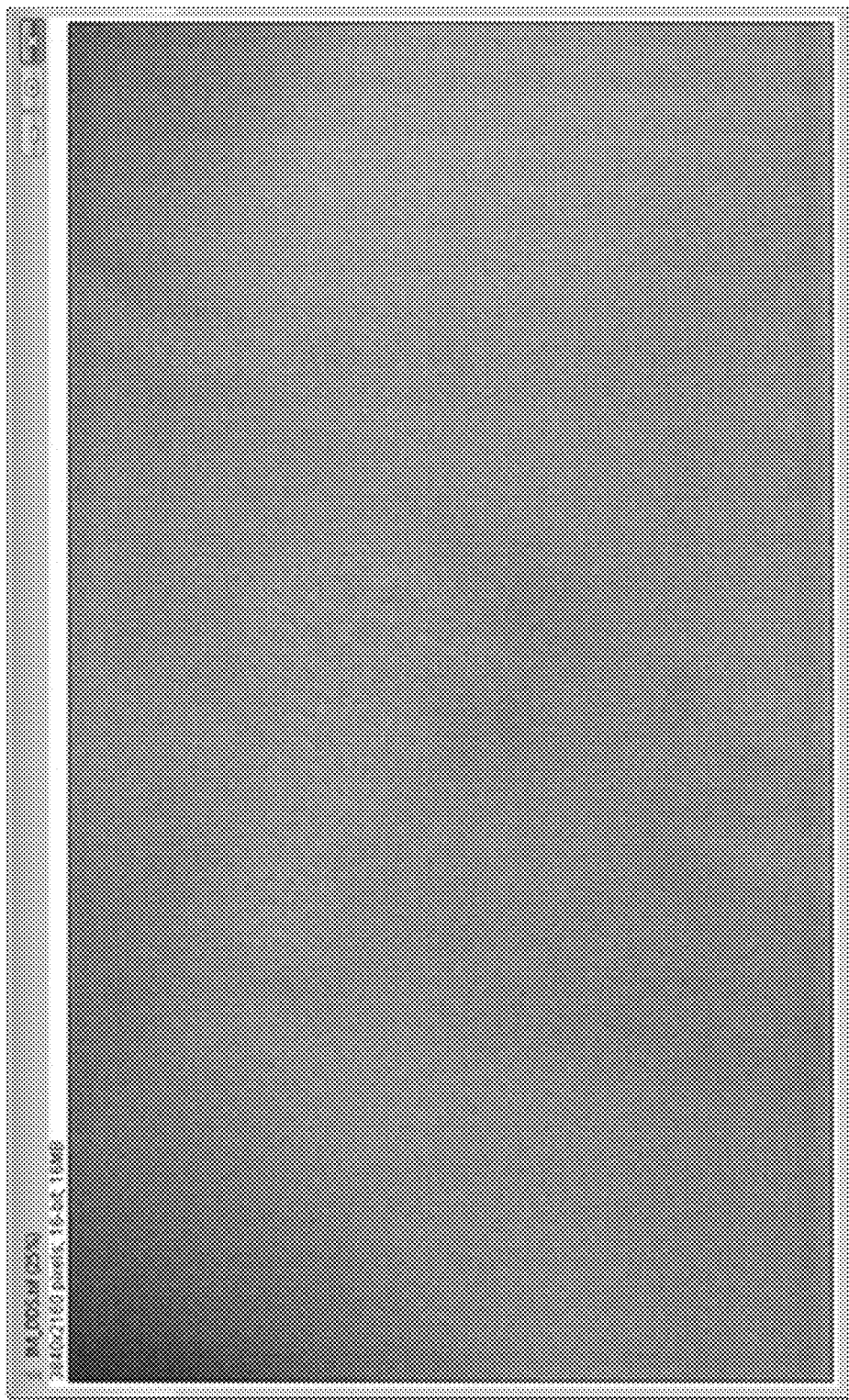
FIG. 12 illustrates an uncorrected pattern on an example picture.

FIG. 12 illustrates an uncorrected pattern on an example picture. A modulo 4 k correction may be similar as in LDK86 High-speed mode, a modulo pattern is visible. In U23A this shows as a modulo 128. Because an example has 2112 columns with a shared pixel, the correction is proposed to be modulo 2 k. This means each gain/offset value can be used for 2 consecutive pixels.

In one example, a full 4 k resolution correction may be used. Another example may use sensors for ~2 k columns, where each column connects to a row of 1125 four-shared pixels. Using ~2 k columns results in a sensor resolution of 4 k×2250. Another example with the 2 k columns may use a 2 k correction, thus, such an example may use every correction value 2× in horizontal direction. This may mean a reduction of hardware resources of 2× while maintaining our correction functionality. For different pixel structures this 4 k/2 k choice may change.

Figure 13:
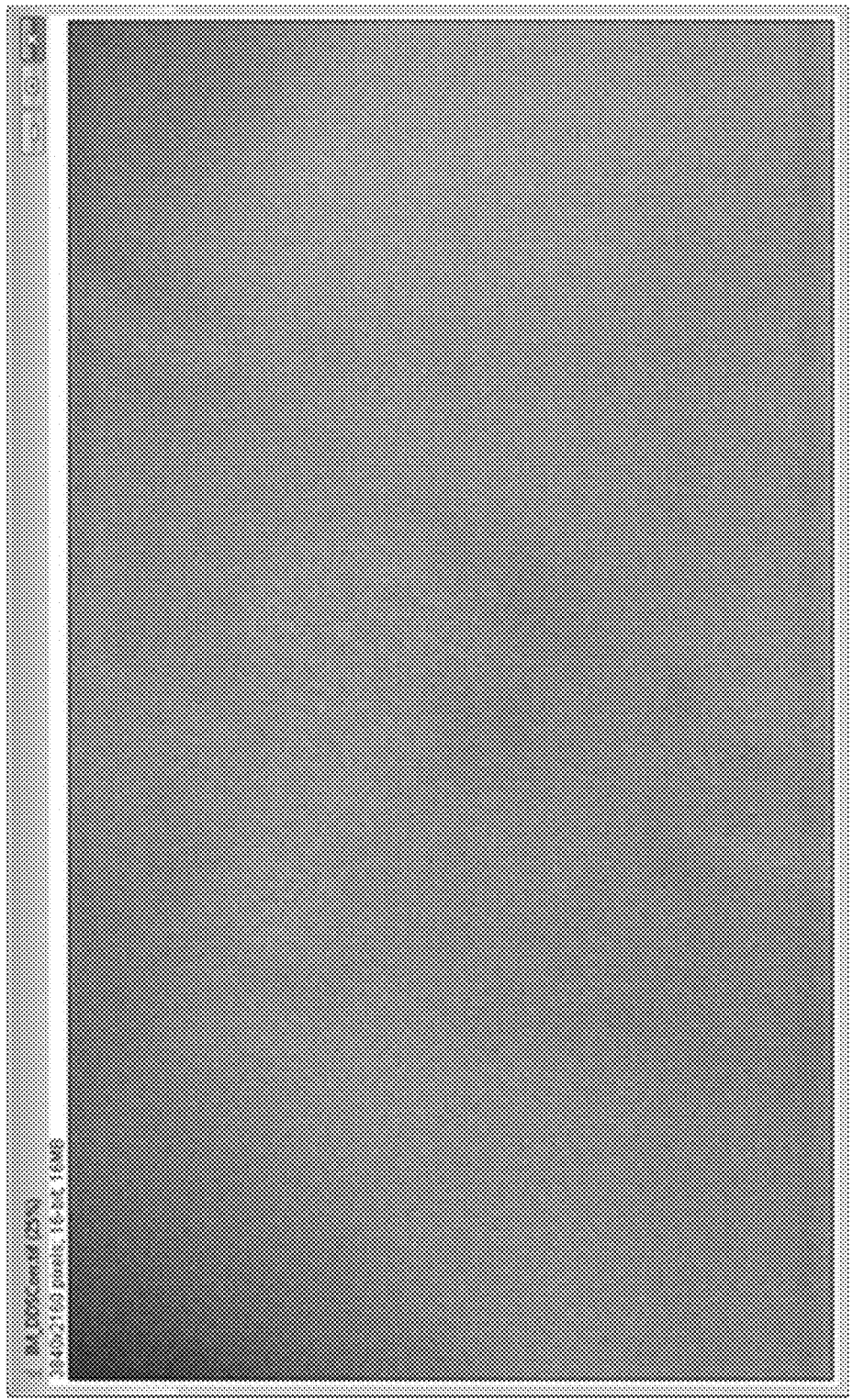
FIG. 13 illustrates of a result for a corrected pattern on an example picture according to an exemplary embodiment.

In an example, correction may be performed by sum all rows from a DDS-ed image (modDDS), filter this result with at least 128 samples (in case of 2 k, this reduces to 64) (AVG_DDS), sum all rows from a Raw_Dark image (modDark), and filter this result as the DDS-average line (AVG_Dark).

alpha=(modDDS−AVG_DDS)./AVG_DDS; % Use DDS as source offset=AVG_Dark−(modDark−(alpha.*modDark));

Accuracy may be: alpha=ufix(0,16,15), offset=sfix(1,16, 4). Applying the resulting gain alpha and offset:

IM_BrightCorr=IM_bright−(IM_bright.*IM_gain+
       IM_offset);

IM_Bright2Corr=IM_bright2−
       (IM_bright2.*IM_gain+IM_offset);

IM_DarkCorr=IM_dark−(IM_dark.*IM_gain+
       IM_offset);

IM_DDS1_Corr=double(IM_BrightCorr−IM_Dark-
       Corr)/2;

IM_DDS2_Corr=double(IM_Bright2Corr−
       IM_BrightCorr)/2;

IM_DDSCorr=mask_odd.*IM_DDS1_Corr+
       (mask_even.*IM_DDS2_Corr)*OddEvenGain;

FIG. 13 illustrates of a result for a corrected pattern on an example picture.

Figure 14:
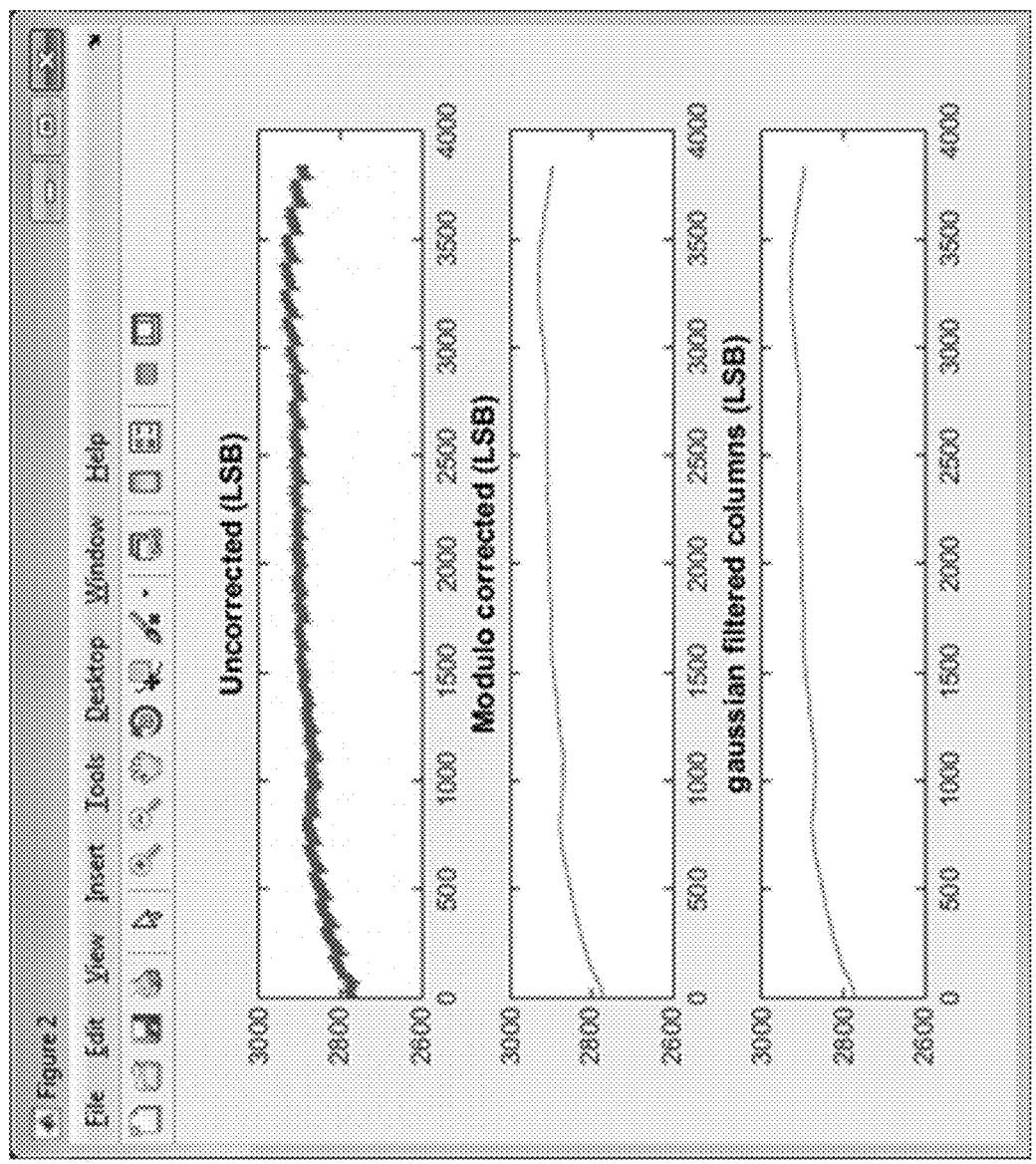
FIG. 14 illustrates an example graph for uncorrected and corrected least significant bits according to an exemplary embodiment.

FIG. 14 illustrates an example graph for uncorrected and corrected least significant bits. In an example, a same set of camera system requirements may be used as with quadruplet correction.

Figure 15:
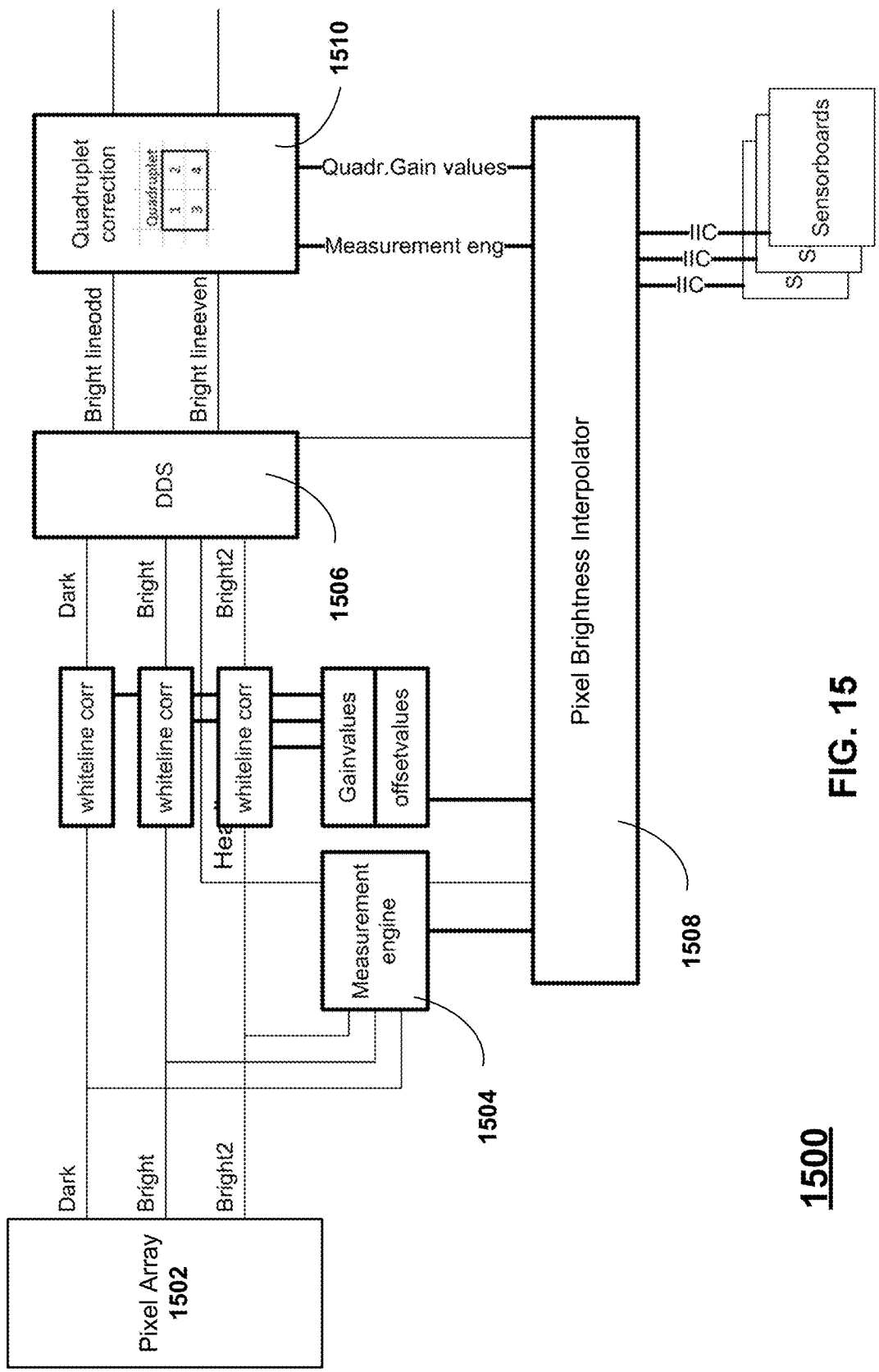
FIG. 15 is an example block diagram illustrating a system for pixel brightness correction according to an exemplary embodiment.

FIG. 15 is an example block diagram illustrating a system for pixel brightness correction according to an exemplary embodiment. For example, the bright correction may be implemented within the quadruplet correction block. The quadruplet correction block may be controlled by a processor.

As described herein, in very bright areas a pixel will saturate. In a shared pixel, there might be differences between the shared pixel on the saturation level. An example is a pixel with quincunx structure, but other structures might have same effect.

In very bright areas resolution may be sacrificed in favor of artifacts when pixel starts saturating. The subpixel with best performance may be kept. Additionally, the subpixel with best performance may be may be interpolated to replace the subpixel which is saturating on a lower illumination level. In an example, a way of mixing from one level to another may be done with a fader to eliminate fast switching. An example may keep a lower illuminated part of a scene untouched, and for high brightness parts of the scene the deviating pixels may be interpolated from the brightest ones through the quincunx interpolation, as opposed to clipping the higher part and ignore the higher values which start deviating. In some examples, the usable dynamic range of the imager is extended.

As shown, an image processing system 1500 (or image processor) is provided for correcting brightness of saturated pixels in an image sensor. For example, the image sensor can include a pixel array 1502 having a plurality of pixels each configured to capture image data. Moreover, a pixel brightness measurement engine 1504 is provided and configured to measure a pixel brightness of the pixels in the pixel array for the captured image data according to the methods described above. As further shown, a pixel saturation determination unit 1506 can be configured to perform DDS to calculate the pixel gains and, therefore, further determine whether the one or more pixel are saturated if the measured pixel brightness is greater than a predetermined pixel saturation threshold, as further described above.

In addition, a pixel brightness interpolator 1508, which can be one or more microprocessors, for example, is calculate interpolated brightness value to correct the saturated pixel based on the measured brightness value of the saturated pixels and a brightness value of neighboring pixels in the pixel array. In a refinement of the exemplary aspect, the microprocessor 1508 can determine a pixel correction value, which can be dependent on whether the measured pixel brightness value is above, below or between the thresholds as further described above. Based on the calculated interpolated brightness value (e.g., a pixel correction value), a pixel brightness corrector 1510 is provided to correct the pixel brightness of the saturated pixel(s) based on the calculated interpolated brightness value as further described above. Finally, although not specifically shown, an image generator is provided to display on a display device the captured image data having the corrected pixel brightness of the saturated at least one pixel. The image generator can be decoder 141 and the display device can be display 142 described above according to an exemplary embodiment.

FIG. 16 is a flowchart illustrating an example method 600 for pixel brightness correction according to an exemplary embodiment. As shown, initially in a step 1602, process an image from the image sensor by comparing a pixel brightness of the image to a first threshold and a second threshold. For example, a pixel brightness measurement engine may first measure a pixel brightness of a plurality of pixels for image data captured by a camera and a pixel saturation comparator can then compare the measured pixel brightness of one or more of the plurality of pixels with first and second saturation thresholds In a step 1604, select the pixel brightness when the pixel brightness is below the first threshold. For example, a pixel brightness selector can select the measured pixel brightness of the one pixel as an output pixel brightness when the measured pixel brightness of the at least pixel is less than the first saturation threshold.

In a step 1606, select a neighboring pixel brightness when the pixel is above the second threshold. For example, the pixel brightness selector can select a measured pixel brightness of at least one neighboring pixel as the output pixel brightness when the measured pixel brightness of the at least pixel is greater than the second saturation threshold; and In a step 1608, perform an average of pixel brightness when the pixel brightness is between the first and second threshold. For example, in one aspect, a pixel brightness interpolator can calculate an interpolated brightness value when the brightness is between the first and second thresholds to correct the saturated pixel(s). This interpolated brightness value can be based on the measured brightness value of the saturated pixel and a brightness value of one or more neighboring pixels of the plurality of pixels as described above.

Finally, after the pixel brightness has been corrected, an image generator displays on a display device the image data having the selected output pixel brightness of the at least one pixel of at least one of the plurality of pixels. As a result, the generated corrected image can be displayed without artifacts due to the saturated pixel(s), which have been replaced with a pixel correction value based on a pixel brightness one or more unsaturated (e.g., neighboring) pixels in the image sensor.

By way of example and without limitation, the aspects of the present disclosure are presented with reference to systems and methods used to configure various components of a video production system that may be used for production of television programming or at sports events. The various concepts presented throughout this disclosure may be implemented across a broad variety of imaging applications, including systems that capture and process video and/or still images, video conferencing systems and so on.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. An image processing system for correcting brightness of saturated pixels in an image sensor, the image processing system comprising:
    a pixel array comprising a plurality of pixels each configured to capture image data;
    a pixel brightness measurement engine configured to measure a pixel brightness of at least one pixel of the plurality of pixels for the captured image data;
    a pixel saturation determiner configured to determine that the at least one pixel is saturated when the measured pixel brightness is greater than a predetermined pixel saturation threshold;
    a pixel brightness interpolator configured to calculate an interpolated brightness value to correct the saturated at least one pixel based on the measured pixel brightness of the saturated at least one pixel and a pixel brightness value of at least one neighboring pixel of the plurality of pixels that is adjacent to the saturated at least one pixel;
    a pixel brightness corrector configured to correct the pixel brightness of the saturated at least one pixel by replacing the measured pixel brightness of the saturated at least one pixel with the pixel brightness value of the at least one neighboring pixel when the measured pixel brightness is greater than a predetermined high pixel saturation threshold that is greater than the predetermined pixel saturation threshold; and
    an image generator configured to display on a display device the captured image data having the corrected pixel brightness of the saturated at least one pixel.

2. The image processing system according to claim 1, wherein the pixel saturation determiner is further configured to determine that the at least one pixel is unsaturated when the measured pixel brightness is less than a predetermined pixel unsaturation threshold.

3. The image processing system according to claim 2, wherein the pixel brightness corrector is further configured to use the value of the measured pixel brightness of the at least one pixel without correcting the pixel brightness when the pixel saturation determiner determines that the at least one pixel is unsaturated.

4. The image processing system according to claim 1, wherein the pixel brightness interpolator is further configured to calculate the interpolated brightness value by averaging measured gains of the saturated at least one pixel and the at least one neighboring pixel, respectively.

5. The image processing system according to claim 1, wherein the pixel brightness corrector is further configured to replace the measured pixel brightness value of the saturated at least one pixel with average brightness values of a plurality of neighboring pixels.

6. The image processing system according to claim 1, wherein the pixel brightness interpolator is further configured to calculate the interpolated brightness value by performing a weighted average of the measured pixel brightness value of the saturated at least one pixel and the brightness value of at least one neighboring pixel.

7. An image processing system for correcting brightness of saturated pixels in an image sensor, the image processing system comprising:
    a pixel brightness measurement engine configured to measure a pixel brightness of a plurality of pixels for image data captured by a camera;
    a pixel saturation comparator configured to compare a measured pixel brightness of at least one of the plurality of pixels with first and second saturation thresholds;
    a pixel brightness selector configured to select the measured pixel brightness of the at least one pixel as an output pixel brightness when the measured pixel brightness of the at least one pixel is less than the first saturation threshold, and to select a measured pixel brightness of at least one neighboring pixel as the output pixel brightness when the measured pixel brightness of the at least one pixel is greater than the second saturation threshold; and
    an image generator configured to display on a display device the image data having the selected output pixel brightness of the at least one pixel of the plurality of pixels.

8. The image processing system according to claim 7, further comprising a pixel array comprising the plurality of pixels each configured to capture the image data.

9. The image processing system according to claim 7, further comprising a pixel brightness interpolator configured to calculate an interpolated brightness value when the measured pixel brightness of at least one pixel is between the first and second saturation thresholds.

10. The image processing system according to claim 9, wherein the pixel brightness interpolator is further configured to calculate the interpolated brightness value based on a value of the measured pixel brightness of the at least one pixel and a brightness value of at least one neighboring pixel of the plurality of pixels that is adjacent to the at least one pixel.

11. The image processing system according to claim 10, wherein the pixel brightness interpolator is further configured to calculate the interpolated brightness value by averaging measured gains of the at least one pixel and the at least one neighboring pixel, respectively.

12. The image processing system according to claim 9, wherein the pixel brightness interpolator is further configured to calculate the interpolated brightness value by performing a weighted average of the measured pixel brightness of the at least one pixel and the brightness value of at least one neighboring pixel.

13. An image processor for correcting brightness of saturated pixels of a captured image, the image processor comprising:
    a pixel saturation determiner configured to determine whether at least one pixel in an image sensor is saturated when a pixel brightness of the at least one pixel is greater than at least one saturation threshold;

a pixel brightness interpolator configured to calculate a pixel correction value to correct the saturated at least one pixel based on a measured pixel brightness value of the saturated at least one pixel and a pixel brightness value of at least one neighboring unsaturated pixel in the image sensor that is adjacent to the saturated at least one pixel, wherein the pixel correction value is calculated by averaging measured gains of the saturated at least one pixel and the at least one neighboring unsaturated pixel, respectively; and an image enhancer configured to generate a corrected image without one or more image artifacts due to the saturated at least one pixel by replacing the pixel brightness of the saturated at least one pixel with the calculated pixel correction value based on the pixel brightness value of the at least one neighboring unsaturated pixel in the image sensor when the measured pixel brightness value of the saturated at least one pixel is greater than a predetermined high pixel saturation threshold that is greater than the at least one saturation threshold.

14. The image processor according to claim 13, further comprising an image generator configured to display on a display device the corrected image without the one or more artifacts.

15. The image processor according to claim 13, further comprising a pixel brightness measurement engine configured to measure the pixel brightness of at least one pixel in the image sensor.

16. The image processor according to claim 15, further comprising a pixel brightness selector configured to select the measured pixel brightness of the at least one pixel as the pixel correction value when the measured pixel brightness of the at least one pixel is less than the at least one saturation threshold.

17. The image processor according to claim 16, wherein the pixel brightness selector is further configured to select a measured pixel brightness of at least one neighboring pixel as the pixel correction value when the measured pixel brightness of the at least one pixel is greater than the at least one saturation threshold.

18. The image processor according to claim 13, wherein the pixel brightness interpolator is further configured to calculate the pixel correction value by average a plurality of pixel brightness values of a neighboring unsaturated pixels.

19. The image processor according to claim 13, wherein the pixel brightness interpolator is further configured to calculate the pixel correction value by performing a weighted average of the measured brightness value of the saturated at least one pixel and the pixel brightness value of the at least one neighboring unsaturated pixel.

* * * * *